United States Patent [19]

Gazalski

[11] Patent Number: 4,885,861
[45] Date of Patent: Dec. 12, 1989

[54] STANDING GOOSE DECOY

[76] Inventor: Richard S. Gazalski, Hwy. 75 N., P.O. Box 937, Henryetta, Okla. 74437

[21] Appl. No.: 299,051

[22] Filed: Jan. 19, 1989

[51] Int. Cl.$^4$ ............................................. A01M 31/06
[52] U.S. Cl. ............................................................ 43/3
[58] Field of Search ........................................ 43/2, 3

[56] References Cited

U.S. PATENT DOCUMENTS

| | | | |
|---|---|---|---|
| 2,313,353 | 3/1943 | Mills | 43/3 |
| 2,439,710 | 4/1948 | Banigan | 43/3 |
| 2,450,572 | 10/1948 | Ballard | 43/3 |
| 3,478,459 | 11/1969 | Galalski | 43/3 |
| 4,658,530 | 4/1987 | Ladehoff | 43/3 |
| 4,768,988 | 9/1988 | Rutter | 43/3 |

Primary Examiner—M. Jordan
Attorney, Agent, or Firm—Shoemaker and Mattare, Ltd.

[57] ABSTRACT

A shell decoy with a hollow foot and leg attachment is described herein where the attachment can be filled with sand or lead shot or other heavy particulate material sufficient to enable the decoy to stand in the position selected on soft or frozen ground to give a more life like appearance to the decoy.

1 Claim, 4 Drawing Sheets

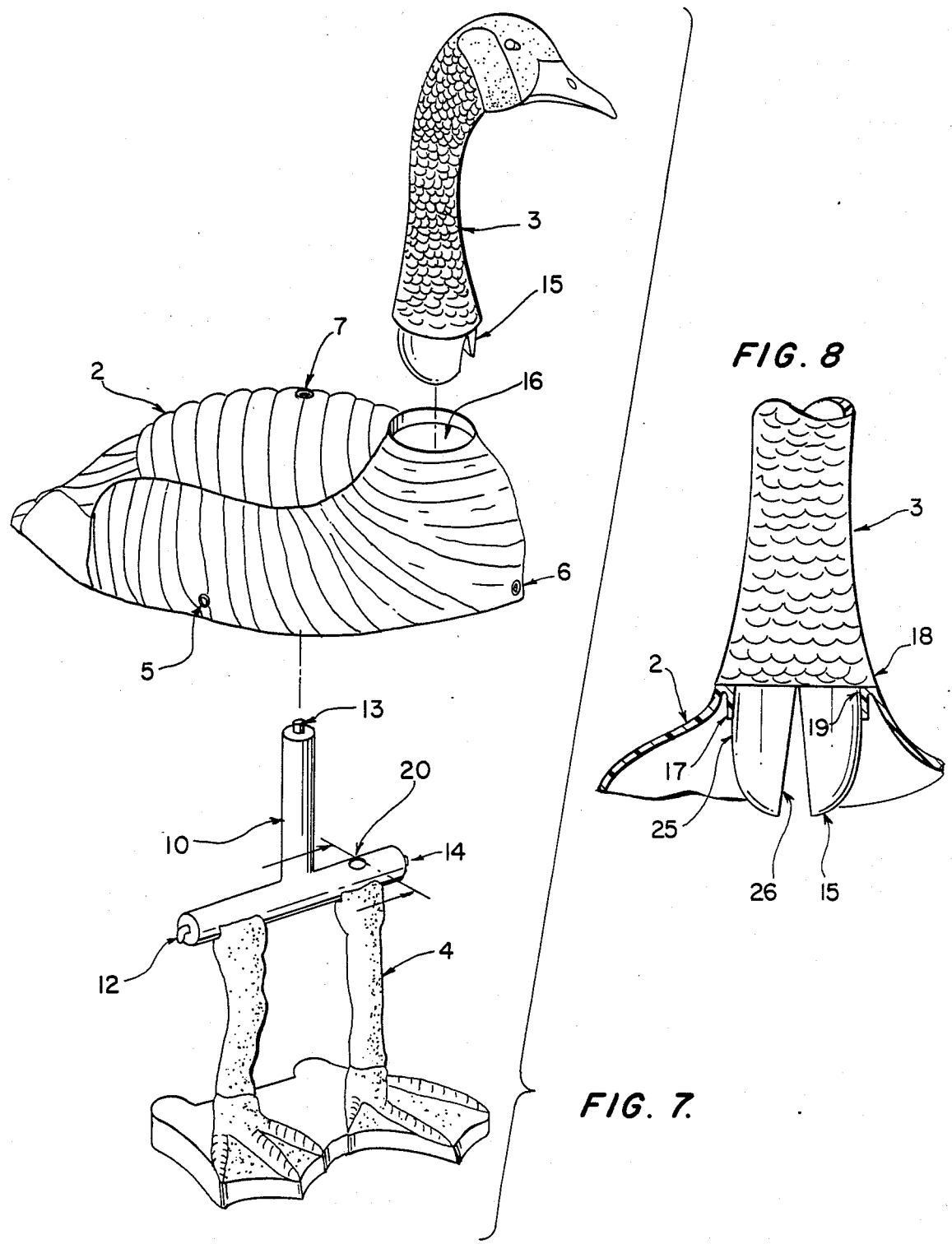

STANDING GOOSE DECOY

FIELD OF THE INVENTION

This invention relates to the field of waterfowl hunting and particularly to the hunting of migratory birds especially geese from blinds on land where the hunters shoot over decoys.

BACKGROUND OF THE INVENTION

Decoys presently available for use by hunters in land-based blinds typically include silhouette decoys, windsock decoys, so-called shell decoys and even stuffed decoys. The object of a decoy is to present as realistic a picture of a group of feeding birds to a group, or singles, flying overhead to bring the flying birds closer or even to land to join the feeding group. For a group of decoys to be successful, it is generally believed that the more realistic the decoys are in appearance, the more likely they are to be mistaken for actual feeding or resting birds. From this standpoint, silhouette decoys are the least desireable since a circling group of birds will see an ever changing picture of the group on the ground as the view both profiles and then nothing as they circle. This phenomenon necessitates placing many decoys in different positions to account for the various viewing angles which often makes the group of decoys or individuals appear to be facing other than into the wind, the most typical attitude encountered in real birds feeding or resting on the ground.

Windsock decoys are popular where movement is desireable to give the appearance of live birds and where the prevailing weather conditions permit the decoys to act properly, i.e. enough wind to inflate the windsock and give the appearance of a full bodied bird but not so much wind that there will be damage to the attachment of the fabric or plastic to the head piece or frame.

Shell decoys are popular since they give the appearance of full bodied birds from any viewing angle and can be relatively inexpensively produced to be durable. With detachable head pieces various neck and head positions can be duplicated from upright to bent down to simulate a feeding bird or even back to simulate preening. The thin usually flexible plastic material of the shell permits shells, with the head piece removed to be stacked for easy storage and transport to the area of the blind. Normally the means for anchoring shell decoys is by a stake having an upper bracket which is removably attachable to the shell through holes in the plastic of the shell which in the better models are reinforced with grommets.

These decoys are generally durable enough to withstand fairly severe weather conditions but have limited utility as decoys where the ground is frozen. Their success is dependent upon proper placement so that the body appears above the ground the approximate distance that a live bird would stand. Shells that have to be placed on the surface of the ground lose a degree of realism in appearance which can be recognized by high flying birds. It is, therefore, desireable to provide shell decoys with a means for proper placement which can function where the earth is frozen and the stake attachment is not functional.

It is also desireable to provide the shell decoy with simulated legs and feet which will enhance the close up appearance of the decoy, a necessary requirement now with the expanded use of steel shot which has a dramatically shorter range than the lead shot previously used. Thus steel shot requirement has necessitated much more realism in the decoys used as it is now imperative that the flying birds are brought much closer to the decoys before a successful shot can be taken by conscientious hunters.

It is, therefore, an objective of the present invention to provide a shell decoy with a means for placement and use that will work on soft or frozen ground.

It is another objective of the present invention to provide a shell decoy which has legs and feet closely resembling that of a standing bird.

It is a still further objective of the present invention to provide a shell decoy with an improved removable head piece attachment.

BRIEF SUMMARY OF THE INVENTION

A shell decoy with a hollow foot and leg attachment is described herein where the attachment can be filled with sand or lead shot or other heavy particulate material sufficient to enable the decoy to stand in the position selected on soft or frozen ground to give a more life like appearance to the decoy.

BRIEF DESCRIPTION OF THE DRAWINGS

FIG. 7 is an exploded view of the components of the assembled decoy of the present invention.

FIG. 8 is a partial cross section of the head piece attachment to the shell decoy body.

DETAILED DESCRIPTION OF THE INVENTION

Figure 1:
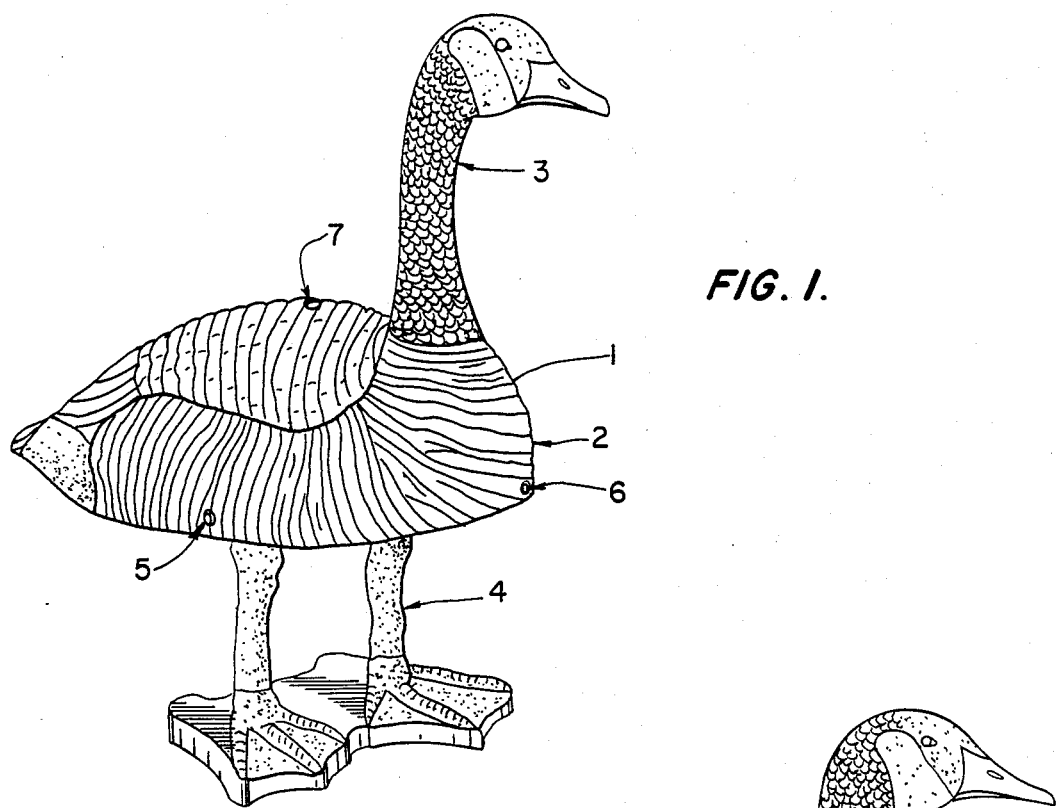
FIG. 1 is a perspective of an assembled decoy according to the present invention.

Referring to FIG. 1, for purposes of illustration a shell decoy 1 of a canadian goose is shown with a shell decoy body 2, a head piece 3, leg and foot assembly 4 and reinforced grommet holes 5, 6 and 7.

Figure 2:
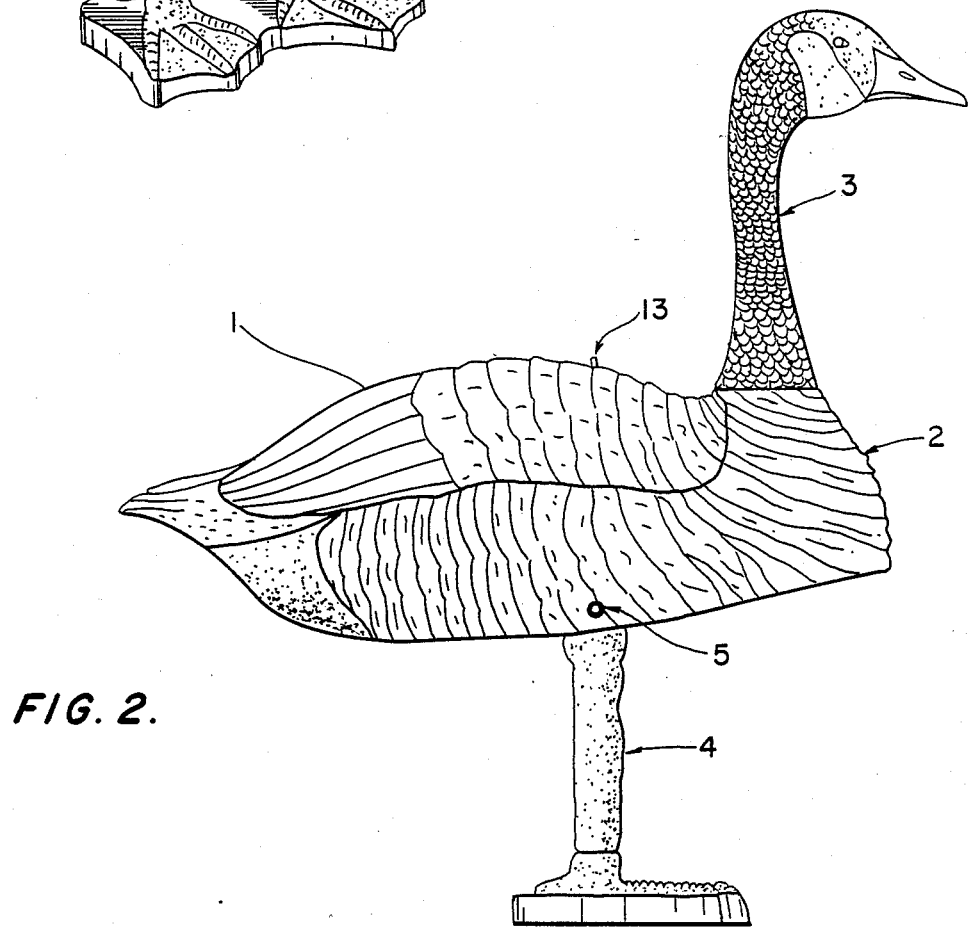
FIG. 2 is a side elevation view of the assembled decoy of the present invention.

In FIG. 2 the attachment tip 13 can be protruding above the shell body 2 through the hole 7. Other waterfowl simulations can of course be made following the description contained herein.

Figure 3:
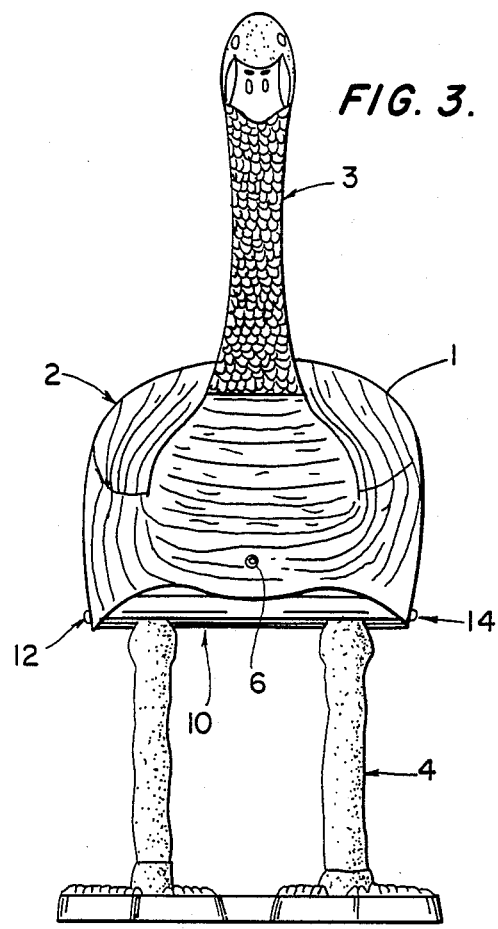
FIG. 3 is a front elevation view of the assembled decoy of the present invention.
Figure 4:
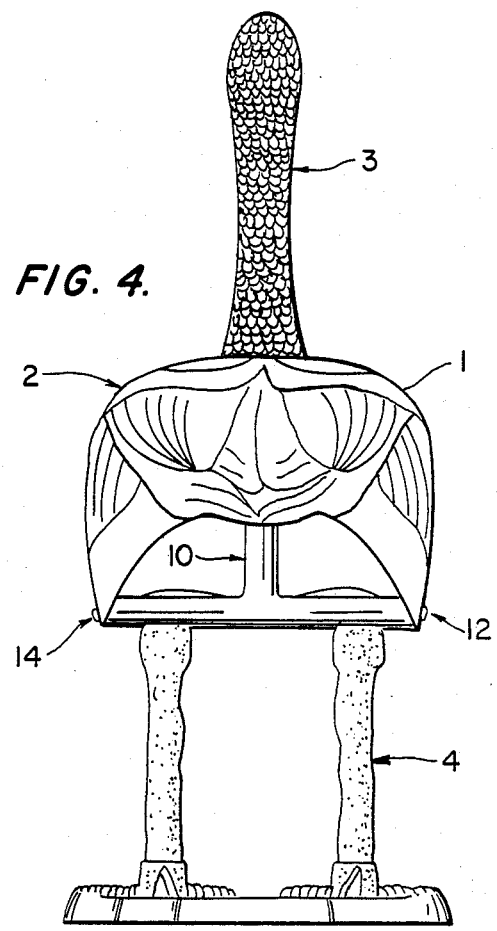
FIG. 4 is a rear elevation view of the assembled decoy of the present invention.
Figure 5:
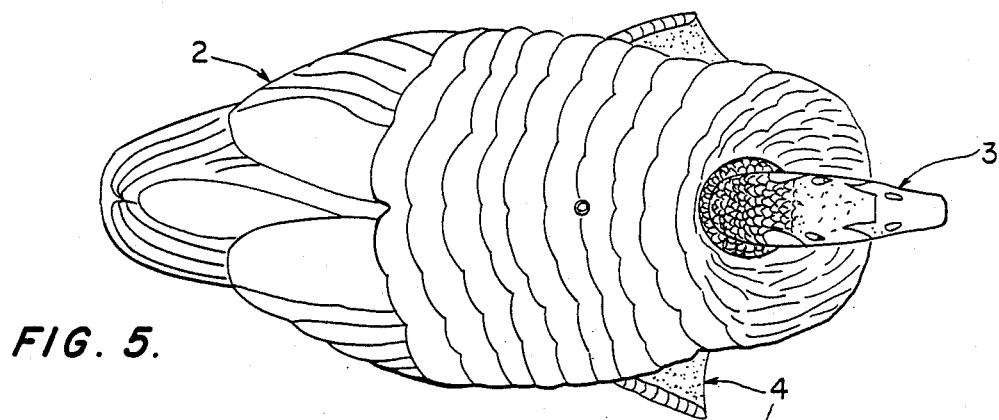
FIG. 5 is a top plan view of the assembled decoy of the present invention.
Figure 6:
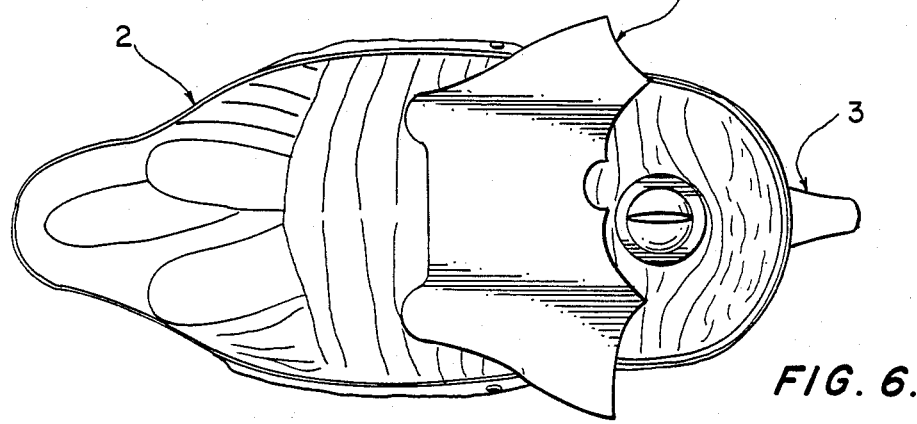
FIG. 6 is a bottom plan view of the assembled decoy of the present invention.
Figure 9:
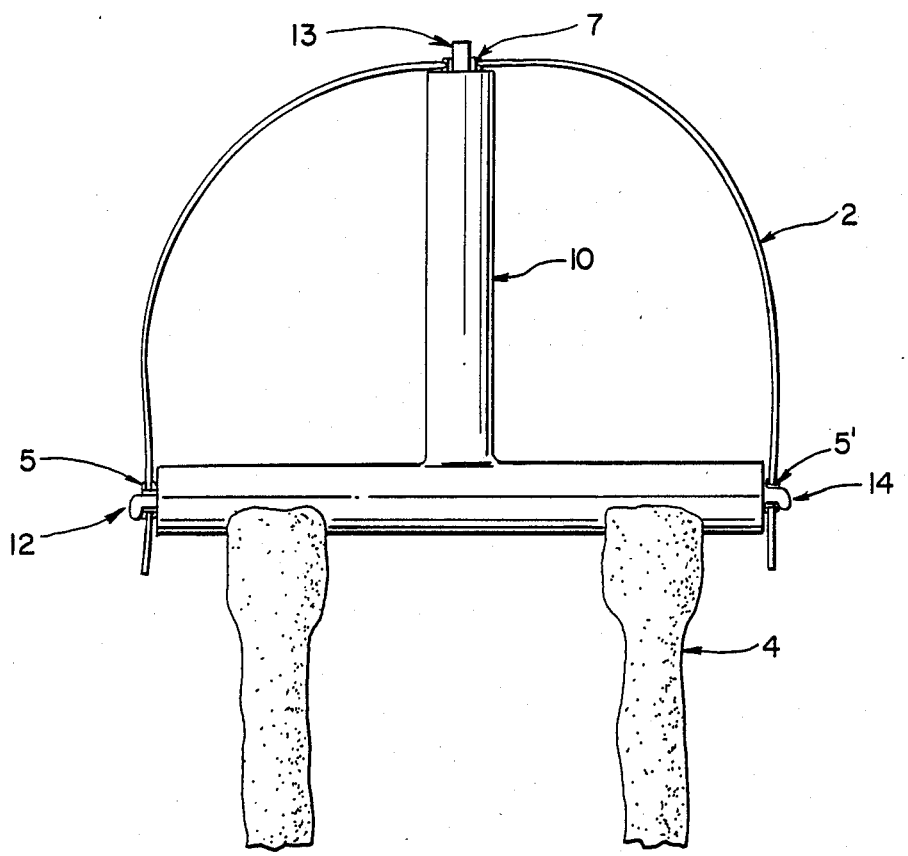
FIG. 9 is a partial section of the front elevation of the leg mounting bracket attached to the shell decoy body.

In FIGS. 3 and 4 the leg and foot assembly 4 is shown integrally attached to, or otherwise formed together with a bracket assembly 10 and the shell attachment protrusions 12 and 14 can be seen protruding through reinforce grommet holes on either side of the shell body 2. The details of the attachment of the bracket assembly 10 to the shell body 2 can be seen on FIG. 9 where the mounting bracket 10, in the shape of an inverted T has an attached or an integrally formed leg and foot assembly 4, and the terminus of the three ends of the T shaped mounting bracket are provided with shaped protrusions 12 and 14 capable of being received through reinforced grommet holes 5 and 5' so that the natural springiness of the shell body 2 cooperates with the L-shape of the protrusions 12 and 14 shown, to releasably lock the shell body 2 to the T-shaped mounting bracket 10. The upper most reinforced grommet hole 7, also shown in FIG. 1, receives a straight protrusion 13, also shown in FIG. 2, which extends vertically upward from the terminus of the vertical arm of the inverted T of the mounting bracket 10. The three protrusions 12, 13 and 14, when received through the respective grommet holes 5, 5' and 7 firmly locate and hold the shell in a proper standing attitude.

Figure 10:
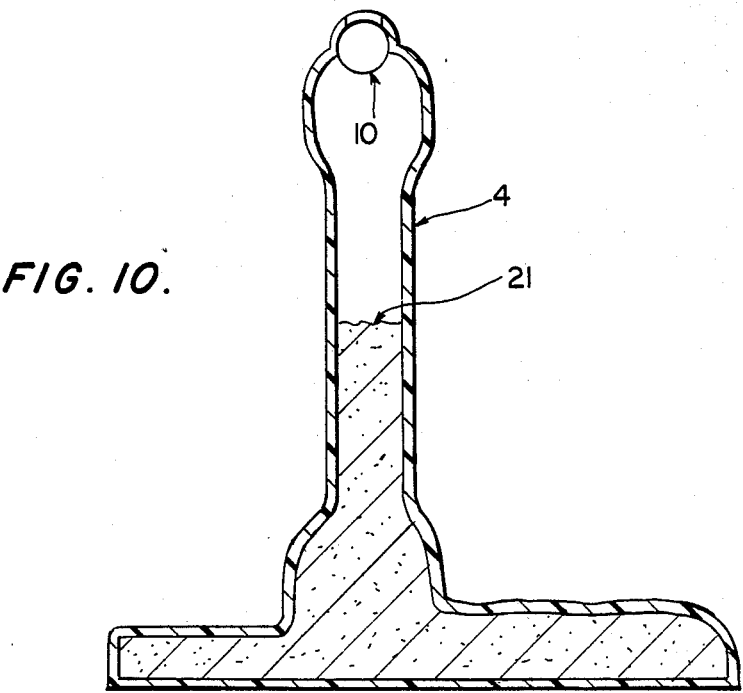
FIG. 10 is a vertical cross-section of a leg and foot of the hollow legs and feet device attached to the mounting bracket of FIG. 9 showing the weight increasing material in its proper position during use.

Referring to the leg and foot assembly shown in FIGS. 1, 2, 3, 4, 7, 9 and 10, in particular in FIGS. 10 and 7, a hole 20 is provided in T-shapes mounting bracket 10 which hole communicates with the hollow interior of the leg and foot assembly shown in FIG. 10. Lead shot, steel shot, sand or other weight imparting material, small enough in particle size to be introduced through said hole 20 can be used to fill the hollow leg and foot assembly at 21, to a depth sufficient to impart stability to the assembled standing decoy.

In addition to the foregoing the head piece 3 of the decoy is provided with a clam shell shaped extension 15 which is received through a neck hole 16 in the decoy shell 2 which is formed by the inward formation of the shell material to form a flange 17. The clam shell shaped extension 15 is sized in circumference at 19 to fit snugly in the circumference of the hole 16 and be smaller than the circumference of the neck 18 of the head piece 3, so as to provide both a smooth transition between the head piece 3 and the shell body 2 for realism, and a releasable removable fit for the head piece 3. Preferably the clam shell shaped extension 15 is larger in diameter at 25 than the hole 16 so that the V-shaped slot 26 shown, will have to be compressed slightly to permit insertion of the extension 15 into the hole 16 and provide an outward spring action to positively hold the neck 18 of the head piece 3 in the proper position. The head piece 3 shown herein can of course be of a different shape to depict a feeding or preening bird.

The utility of the shell decoy described herein is further extended by providing the shell with the conventional grommet hole 6 which is used with the normal stake attachment where conditions permit.

Likewise, in some decoys the hole 6 is used, in combination with other holes, to mount a flotation device permitting the shell to be used as a water instead of a land-based decoy.

The manufacture of the shell 2, the neck piece 3 and the other parts of the assembly described is accomplished according to conventional practice in the field of shell decoys with the additional structure and function described herein being easily accomplished in view of the foregoing description. The specific techniques for forming a hollow foot and leg assembly with a mounting bracket can be accomplished without undue experimentation or independent invention.

This invention has been described in sufficient detail to enable one of ordinary shell in the art to practice the invention. The foregoing disclosure is exemplary only and variations can be made in the structure of the materials without departing from the spirit and scope of the invention which is only limited by the scope of the appended claims in view of the pertinent prior art.

I claim:

1. A waterfowl shell decoy comprising a removable neck and head piece a shell body and a leg and foot assembly wherein said shell body includes neck hole means for receiving a simulated neck and head piece resembling a waterfowl and at least three grommet reinforced holes located on the sides and top of the shell in a vertical plane, said neck and head piece being received in said neck hole in friction tight engagement provided by a clam shell shaped elongated segment of slightly larger circumference than said neck hole diameter and which extends from said neck and head piece below said neck hole when in place, and said leg and foot assembly includes an inverted T-shaped mounting bracket containing protrusions extending beyond the terminus of said T-shaped bracket, said bracket being sized so that said termini do not extend beyond the flexure limits of said shell and said protrusions are received in engagable disengagable relationship with said grommet holes in said shell, said leg and foot assembly further including a unitary hollow simulated legs and feet assembly capable of being weighted with material placed inside their hollow interior, whereby said shell decoy can stand upright with weighted feet to simulate a standing full bodied waterfowl decoy.

* * * * *